US011288603B2

(12) United States Patent
Ratti et al.

(10) Patent No.: US 11,288,603 B2
(45) Date of Patent: Mar. 29, 2022

(54) SYSTEM FOR REAL-TIME OPTIMAL MATCHING OF RIDE SHARING REQUESTS

(71) Applicant: Massachusetts Institute of Technology, Cambridge, MA (US)

(72) Inventors: Carlo Filippo Ratti, Cambridge, MA (US); Paolo Santi, Lexington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 245 days.

(21) Appl. No.: 16/553,770

(22) Filed: Aug. 28, 2019

(65) Prior Publication Data

US 2020/0057967 A1 Feb. 20, 2020

Related U.S. Application Data

(63) Continuation of application No. 14/507,299, filed on Oct. 6, 2014, now Pat. No. 10,438,137.

(51) Int. Cl.
*G06Q 10/02* (2012.01)
*G06Q 10/06* (2012.01)

(52) U.S. Cl.
CPC ..... *G06Q 10/02* (2013.01); *G06Q 10/063114* (2013.01); *G06Q 10/063118* (2013.01)

(58) Field of Classification Search
CPC ........... G06Q 10/02; G06Q 10/063114; G06Q 10/063118
USPC ............................................................... 705/5
See application file for complete search history.

(56) References Cited

U.S. PATENT DOCUMENTS

| | | | | |
|---|---|---|---|---|
| 10,248,120 | B1 | 4/2019 | Siegel et al. | |
| 10,438,137 | B2 | 10/2019 | Ratti et al. | |
| 2009/0187450 | A1 | 7/2009 | Kocis et al. | |
| 2010/0088163 | A1 | 4/2010 | Davidson et al. | |
| 2010/0299177 | A1 | 11/2010 | Buczkowski et al. | |
| 2011/0238457 | A1 | 9/2011 | Mason et al. | |
| 2011/0246404 | A1 | 10/2011 | Lehmann et al. | |
| 2012/0041675 | A1 | 2/2012 | Juliver et al. | |
| 2012/0232943 | A1 | 9/2012 | Myr | |
| 2013/0096827 | A1 | 4/2013 | McCall et al. | |
| 2014/0188775 | A1 | 7/2014 | Lehmann et al. | |
| 2014/0344778 | A1 | 11/2014 | Lau et al. | |
| 2015/0161554 | A1 | 6/2015 | Sweeney et al. | |
| 2015/0324718 | A1* | 11/2015 | Lord .................... | G06Q 10/047 705/7.13 |
| 2015/0324944 | A1 | 11/2015 | Lord et al. | |
| 2015/0339595 | A1 | 11/2015 | Soutter et al. | |

(Continued)

FOREIGN PATENT DOCUMENTS

RU 2014-147760 A 6/2016

OTHER PUBLICATIONS

"Optimization of Dynamic Ridesharing Systems" Published by Sage journals (Year: 2013).*

(Continued)

*Primary Examiner* — Zeina Elchanti
(74) *Attorney, Agent, or Firm* — Wolf, Greenfield & Sacks, P.C.

(57) ABSTRACT

System for optimal matching of ride sharing requests. A trip request manager receives trip requests from patrons and a shareability network is established. The system checks to see whether certain parameters related to ride-sharing delays are less than or equal to other parameters to decide whether trips are shareable.

20 Claims, 1 Drawing Sheet

(56) References Cited

U.S. PATENT DOCUMENTS

| | | | | |
|---|---|---|---|---|
| 2015/0339928 | A1 | 11/2015 | Ramanujam | |
| 2016/0027306 | A1* | 1/2016 | Lambert | G08G 1/123 701/117 |
| 2016/0098650 | A1 | 4/2016 | Ratti et al. | |
| 2016/0209220 | A1 | 7/2016 | Laetz | |
| 2016/0247106 | A1 | 8/2016 | Dalloro et al. | |
| 2016/0273922 | A1 | 9/2016 | Stefan | |
| 2016/0292596 | A1 | 10/2016 | Gaitan et al. | |
| 2016/0300186 | A1 | 10/2016 | Scharaswak et al. | |
| 2016/0342946 | A1 | 11/2016 | Herraiz Herraiz | |
| 2016/0364823 | A1 | 12/2016 | Cao | |
| 2016/0368600 | A1 | 12/2016 | Frolov et al. | |
| 2017/0068917 | A1 | 3/2017 | Rackley et al. | |
| 2017/0123421 | A1 | 5/2017 | Kentley et al. | |
| 2017/0138749 | A1 | 5/2017 | Pan et al. | |
| 2017/0147951 | A1 | 5/2017 | Meyer et al. | |
| 2017/0301054 | A1 | 10/2017 | Sangoi et al. | |
| 2017/0336219 | A1 | 11/2017 | Di Lorenzo et al. | |
| 2018/0018572 | A1 | 1/2018 | Wang et al. | |
| 2018/0096606 | A1 | 4/2018 | Moreira-Matias et al. | |
| 2018/0204158 | A1 | 7/2018 | Ratti et al. | |

OTHER PUBLICATIONS

International Search Report and Written Opinion dated Apr. 23, 2018 in connection with International Application No. PCT/US2018/014333.

International Preliminary Report on Patentability dated Aug. 1, 2019 in connection with International Application No. PCT/US2018/014333.

[No Author Listed], New York Taxi and Limousine Commission. 2014 Taxicab Fact Book. New York City. 2014 ; 13 pages.

Sagarra et al., Supersampling and Network Reconstruction of Urban Mobility. PLOS One, San Francisco, CA Aug. 2015 ; 15 pages.

Wang, Optimizing Ride Matches for Dynamic Ride-Sharing Systems. Ph.D. Thesis. Georgia Institute of Technology. May 2013; 125 pages.

Santi et al., Quantifying the benefits of vehicle pooling with shareability networks. PNAS. Sep. 16, 2014; 111(37):13290-13294.

EP 18741262.2, dated May 4, 2020, Extended European Search Report.

Extended European Search Report dated May 4, 2020 in connection with European Application No. 18741262.2.

Alonso-Mora et al., On-demand high-capacity ride-sharing via dynamic trip-vehicle assignment. PNAS. Jan. 17, 2017;114(3):462-467.

Zhan et al., Measuring the efficiency of urban taxi service system. The Third International Workshop on Urban Computing. UrbComp '14. Aug. 24, 2014:8 pages.

Zhan et al., A graph-based approach to measuring the efficiency of an urban taxi service system. IEEE Transactions on Intelligent Transportation Systems. Apr. 20, 2016;17(9):2479-89.

U.S. Appl. No. 15/409,653, filed Jan. 19, 2017, Ratti et al..

PCT/US2018/014333, dated Apr. 23, 2018, International Search Report and Written Opinion.

PCT/US2018/014333, dated Aug. 1, 2019, International Preliminary Report on Patentability.

* cited by examiner

SYSTEM FOR REAL-TIME OPTIMAL MATCHING OF RIDE SHARING REQUESTS

CROSS-REFERENCE TO RELATED APPLICATIONS

This application is a Continuation of U.S. patent application Ser. No. 14/507,299, filed Oct. 6, 2014, and entitled "SYSTEM FOR REAL-TIME OPTIMAL MATCHING OF RIDE SHARING REQUESTS," which is incorporated herein by reference in its entirety for all purposes.

BACKGROUND OF THE INVENTION

This invention relates to a point-to-point ride sharing system that computes in real time optimal matching of ride sharing requests based on a shareability network.

Analytical and experimental studies based on real-world taxi data sets from different cities in the world (New York, San Francisco, Singapore, and Vienna) have shown a consistent, large potential for taxi ride sharing. In New York, more than 95% of taxi trips can be shared if a maximum delay parameter is set to five minutes, with an operational cost reduction on the order of 30%. Similar results have been obtained in other cities. An operational cost reduction on the order of 30% is very profitable for a taxi company, and allows the definition of a business model in which the benefits of ride sharing are distributed between customers (who pay a lower fare), drivers, and the taxi company itself.

Although several prior art systems have been introduced for real-time collection of trip requests (e.g., taxi e-haling and booking systems), only some of them consider the possibility of sharing rides among patrons. The common practice for ride sharing is that trip requests are elaborated in a sequential fashion: when a new request $R_A$ from patron A arrives, the request is checked for potential sharing with a pool of existing pending requests; depending on parameters such as pickup/dropoff points, patron profile, etc., some of these requests $\{R_1, R_2, \ldots\}$ are considered potentially sharable with $R_A$. The pool $\{R_1, R_2 \ldots\}$ of potentially sharable rides is returned to patron A who then selects the preferred ride sharing option among them, i.e., the ride sharing decision is left to the patron. This method is highly ineffective since a composition of individual patron decisions is not guaranteed to find the system-wide optimal combination of shared trips—and actually in practice it is very likely to build a highly suboptimal solution.

An object of the present invention is a methodology in which trip requests are processed in batches instead of sequentially and trip sharing is decided by a centralized server instead of by a composition of individual customer decisions.

SUMMARY OF THE INVENTION

The system according to the invention for optimal matching of ride sharing requests includes a trip request manager module to receive trip requests from patrons and a trip matching manager module to optimally match trip sharing requests from the trip request manager module. A travel time estimation module and a vehicle dispatching module are also provided. The travel time estimation module calculates:

a. Travel time from $P_A$ to $D_A$ equals $TT_a$
b. Travel time from $P_i$ to $D_i$ equals $TT_b$
c. Travel time from $P_A$ to $P_i$ equals $TT_c$
d. Travel time from $D_i$ to $D_A$ equals $TT_d$
e. Travel time from $P_i$ to $D_A$ equals $TT_e$
f. Travel time from $D_A$ to $D_i$ equals $TT_f$
g. Travel time from $P_i$ to $P_A$ equals $TT_g$
h. Travel time from $P_A$ to $D_i$ equals $TT_h$ wherein $P_A$ is the pickup location for patron A, $D_A$ is the dropoff location for patron A, $P_i$ is the pickup location of patron i and $D_i$ is the dropoff location for patron i; and wherein the trip matching manager module computes whether:

$$(t_A+TT_c \le t_i+\Delta) \text{ and } (t_A+TT_c+TT_b+TT_d \le t_A+TT_a+\Delta) \text{ and } (n_a+n_i \le C) \qquad \text{A.}$$

$$(t_A+TT_c+TT_e \le t_A+TT_a+\Delta) \text{ and } (t_A+TT_e+TT_e+TT_f \le t_i+TT_b+\Delta) \text{ and } (n_a+n_i \le C) \qquad \text{B.}$$

$$(t_i+TT_g \le t_A+\Delta) \text{ and } (t_i+TT_g+TT_a+TT_f \le t_i+TT_b+\Delta) \text{ and } (n_a+n_i \le C) \qquad \text{C.}$$

$$(t_i+TT_g+TT_h \le t_i+TT_b+\Delta) \text{ and } (t_i+TT_g+TT_h+TT_d \le t_A+TT_a+\Delta) \text{ and } (n_a+n_i \le C) \qquad \text{D.}$$

wherein if any one of the conditions A, B, C or D is satisfied, trip requests $R_A$ and $R_i$ are sharable, wherein $t_A$ is a desired pickup time for a patron A, $t_i$ is a desired pickup time of a patron $n_a$ is the number of passengers requesting trip A, $n_i$ is the number of passengers requesting trip i, $\Delta$ is a delay parameter and C is passenger seating capacity.

In a preferred embodiment, the trip matching manager module runs a maximum matching algorithm to maximize the number of shared trips. In another embodiment, the trip matching manager is adapted to match more than two shared rides. In yet another embodiment, the trip matching manager module utilizes a maximum weighted matching algorithm to find a collection of shared trips that minimize system operational cost, where the weight assigned to a pair of shareable trips for patrons A and i equals the system operation savings of running a shared trip instead of running the two trips for A and i separately.

DESCRIPTION OF THE PREFERRED EMBODIMENT

Figure 1:
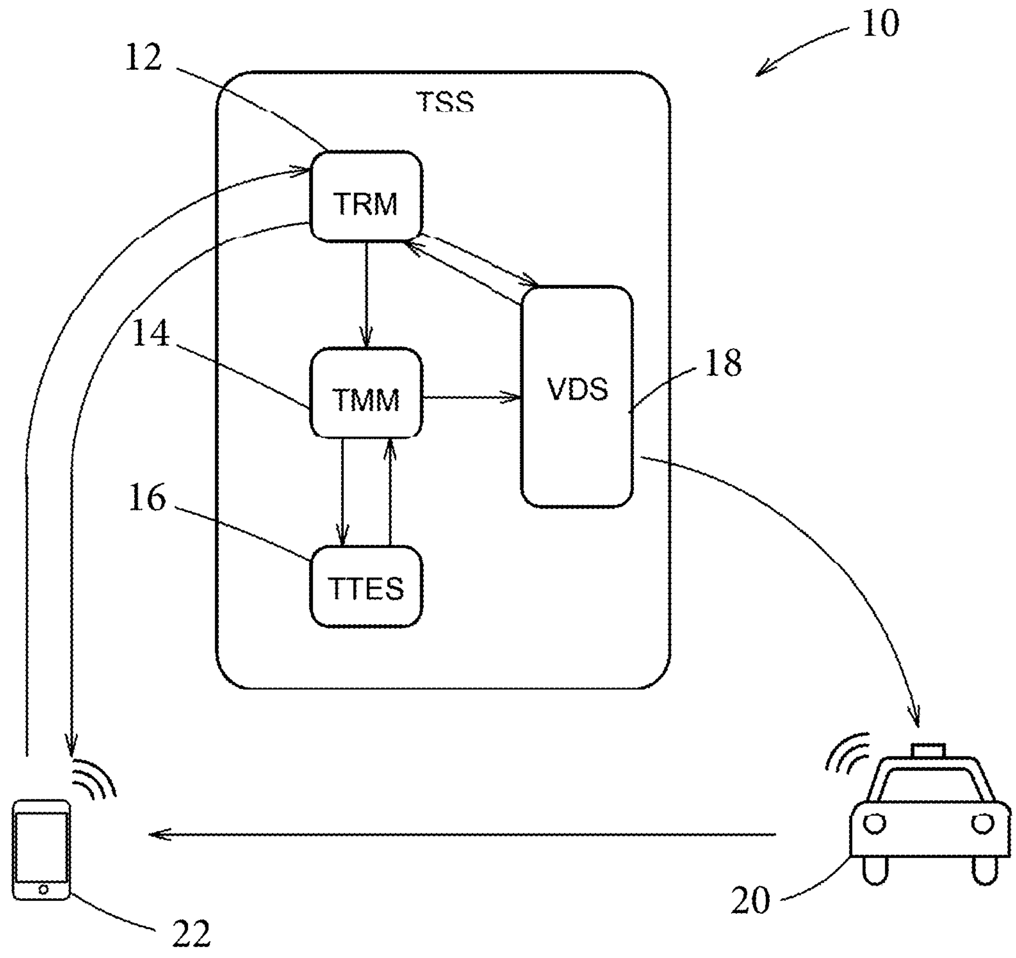
FIG. 1 is a schematic illustration of the ride sharing system according to an embodiment of the invention.

The present invention enables optimal matching of ride sharing requests in real time. Trip requests issued by patrons using their smart phone or similar mobile device are delivered to a central server. As requests arrive, the server builds and maintains a shareability network that is a mathematical model of sharing opportunities between pairs or triplets of trips. At a prescribed time interval T (e.g., one minute), the central server computes the optimal matching of the trips in the current shareability network, and returns the results of the computation to a vehicle dispatching system. The vehicle dispatching system decides the assignment of available vehicles to shared trip requests and notifies the patrons of estimated pickup time and notifies vehicle drivers (or onboard self-driving systems) to pick up the prescribed patrons.

The architecture of an embodiment of the invention is shown in FIG. 1. The system of the invention comprises the following components: a mobile device (smart phone, tablet or similar device) by means of which a patron can interact with a transportation provider; a transportation service system (TSS) operated by a point-to-point transportation provider; and a fleet of vehicles servicing the mobility demand of patrons. These three components communicate with one another by means of wireless communication such as cellular, WiFi or the like. With reference to FIG. 1, the transportation service system (TSS) 10 includes a trip request manager module (TRM) 12 that collects and responds to patron requests. The request from the TRM 12 is delivered to a trip matching manager module (TMM) 14 that optimally matches trip sharing requests according to the shareability network methodology to be described below. The TMM 14 communicates with a travel time estimation system (TTES) 16 that is used to build and maintain the shareability network. A vehicle dispatching system (VDS) 18 dispatches vehicles 20 to service the trip requests.

Still referring to FIG. 1, a patron A accesses the point-to-point transportation application on his or her mobile device 22 and requests a trip by issuing a trip request $R_A$. The trip is specified by including in the request a pickup location $P_A$ (which can be derived from the GPS of the mobile device 22), a dropoff location $D_A$ (e.g., an address), the desired pickup time $t_A$, and the number $n_A$ of passengers requesting the trip. The application offers the patron the possibility of requesting a shared trip which can be done by pressing a suitable button in the app GUI. The patron is informed by the application that he or she will receive a response from the system within a time T, where T is a system parameter chosen by the transportation service provider. Whether the requested trip is shareable is indicated in the trip request through a sharability field $S_A$ set to 1 if the trip is shareable, and set to 0 otherwise. The trip request is transmitted to the TSS 10 by means of wireless communication, e.g., using an available cellular or WiFi connection.

The trip request is received by the TRM 12 and forwarded to the TMM 14 when the shareability field $S_A$ in the request is set to 1. If there is to be no ride sharing, the request is merely forwarded directly to the VDS 18 for vehicle 20 dispatch.

The TMM 14 builds and maintains a data structure called a shareability network. The data structure contains one element for each active request, where the set R equals $\{R_1, R_2, \ldots\}$ of active requests is defined to be the set of requests for which trip matching and vehicle dispatching has not yet been defined. Furthermore, the element corresponding to request $R_i$ in the data structure contains the number of passengers $n_i$ in the request and a reference to the elements of the data structure corresponding to a set of shareable requests $R_j$, $R_k$, . . . , which is defined as the subset of R comprised of all and only the requests in R that can be shared with $R_i$. Sharability between trips is determined according to the following procedure.

When a new request $R_A$ arrives from the TRM 12, a new element corresponding to $R_A$ is built in the shareability network. Furthermore, each request $R_i$ in R is considered. If said R is empty then R is set to $R=\{R_A\}$. If R is not empty, for each considered request $R_i$ the TMM 14 determines whether $R_A$ and $R_i$ can be shared according to the following method. Let $P_A$, $D_A$, $P_i$, $D_i$ be the pickup and dropoff locations of the two trips. Let $t_A$, $t_i$ be the respective desired pickup times and let $n_A$, $n_i$ be the respective number of passengers. The TMM 14 interrogates the TTES 16 requesting computation of the following travel times:

a. From $P_A$ to $D_A$
b. From $P_i$ to $D_i$
c. From $P_A$ to $P_i$
d. From $D_i$ to $D_A$
e. From $P_i$ to $D_A$
f. From $D_A$ to $D_i$
g. From $P_i$ to $P_A$
h. From $P_A$ to $D_i$ The TTES 16 responds to the TMM 14 sending a list of estimated travel times, called $TT_a$, $TT_b$, . . . , $TT_h$—each referring to the start/ending point of the travel.

The TMM 14 receives the estimated travel times $TT_a$, $TT_b$, . . . , $TT_h$ and performs the following actions, where Δ is a predefined system parameter called the delay parameter and C is a predefined system parameter called the vehicle passenger seating capacity.

The system checks whether $$(t_A+TT_c \le t_i+\Delta) \text{ and } (t_A+TT_c+TT_b+TT_d \le t_A+TT_a+\Delta) \text{ and } (n_a+n_i \le C) \quad \text{A.}$$

$$(t_A+TT_c+TT_e \le t_A+TT_a+\Delta) \text{ and } (t_A+TT_e+TT_e+TT_f \le t_i+TT_b+\Delta) \text{ and } (n_a+n_i \le C) \quad \text{B.}$$

$$(t_i+TT_g \le t_A+\Delta) \text{ and } (t_i+TT_g+TT_a+TT_f \le t_i+TT_b+\Delta) \text{ and } (n_a+n_i \le C) \quad \text{C.}$$

$$(t_i+TT_g+TT_h \le t_i+TT_b+\Delta) \text{ and } (t_i+TT_g+TT_h+TT_d \le t_A+TT_a+\Delta) \text{ and } (n_a+n_i \le C) \quad \text{D.}$$

If any one of the conditions A, B, C, D is satisfied, trip requests $R_A$ and $R_i$ are considered shareable. In such case, a reference to the element of the shareability network corresponding to trip $R_i$ is included with the element corresponding to trip $R_A$, and vice versa. The data structure also records in the elements corresponding to $R_A$ and $R_1$ which of the conditions A, B, C, D for shareability of requests $R_A$ and $R_i$ were satisfied. This is called route information. No action is undertaken otherwise, i.e., in case the two trips cannot be shared.

Every T seconds, where T is the system parameter discussed above, the TMM 14 runs a maximum matching algorithm on the graph uniquely defined by the reference between nodes in the shareability network. The matching algorithm guarantees maximization of the number of shared trips. As a result of this computation, the set of requests in R is partitioned into a set $R_M$ of matched requests, and into a set $R_{NM}$ of non-matched requests. Requests in $R_M$ are organized in pairs representing shared trips as defined by the maximum matching algorithm. For each pair ($R_i$, $R_h$) of requests in $R_M$, a shared trip request is prepared and forwarded to the VDS 18. The shared trip request contains $P_A$, $D_A$, $t_A$, $P_i$, $D_i$, $t_i$, as well as the routing information that has been stored in the shareability network. After the shared trip request is prepared, both the elements corresponding to $R_i$ and $R_j$ in the shareability network are deleted along with corresponding 200 references to $R_j$, $R_j$ in other elements of the data structure. Non-matched requests $R_{NM}$ are forwarded to the VDS 18 as simple trip requests. The simple trip request corresponding to request $R_h$ reports the following information: $P_h$, $D_h$, $t_h$. After the trip request is prepared, the element corresponding to $R_h$ in the shareability network is deleted, along with the corresponding references to $R_h$ in other elements of the data structure.

The VDS 18 receives trip requests either from the TMM 14 or from the TRM 12. Trip requests can be either simple or shared and are processed sequentially. When processing a request, the VDS 18 determines which vehicle 20 should serve the request according to a vehicle dispatching algorithm. Furthermore, the estimated pickup time at the patron's location is computed. In case of a shared trip request, pickup times at both patrons' locations are estimated based on the route information. The VDS 18 informs the TRM 12 of the estimated patrons' pickup time(s).

The VDS 18 informs the vehicle 20 of the trip request and of the corresponding pickup location via wireless communication. In case of a shared trip request, the vehicle is informed of the pickup locations of both patrons, and which of the two patrons should be picked up first. The TRM 12 then informs the patrons of the estimated pickup time(s). Thereafter, the vehicle picks up the patrons.

The above described system can be extended to consider sharing of up to three trips or even larger number of shared trips. The output of the TMM 14 may utilize a maximum weighted matching algorithm to find the collection of shared trips that minimizes system operational cost.

As an optional matter, a patron can be presented with three estimated fares for the requested trip: a fare F1 in case he or she opts for the no sharing option, a fare F2 in case he or she opts for the sharing option but the trip could not be shared, and a fare F3 in the case that a trip is shared. The fares are designed in such a way that F3 is less than or equal to F2 less than or equal to F1.

It is thus seen that trip requests in the present system are processed in batches instead of sequentially as known on the prior art. Further, trip sharing is decided by a centralized server instead of by a composition of individual customer decisions. The invention implements a methodology for computing optimal matching of trips—defined according to a clearly specified parameter—in real-time. Experiments we have performed have shown that the approach disclosed herein can find the optimal matching of as many as 10,000 trips in less than 0.01 seconds when a computer program that matches the trips is executed on a standard Linux server.

Those of ordinary skill in the art will recognize that the present invention can be used to implement a ride-sharing taxi system. Other applications include dynamic, on-demand "flexibus" systems in which a fleet of minivans with moderate seating capacity such as nine seats are used to provide point-to-point transportation to individuals or small groups. More broadly, the present invention can be used to implement any transportation system providing point-to-point transportation for individuals or small groups.

It is recognized that modifications and variations of the present invention will be apparent to those of ordinary skill in the art and it is intended that all such modifications and variations be included within the scope of the appended claims.

What is claimed is:

1. A system for matching ride sharing requests and dispatching vehicles from a fleet of vehicles to meet the requests, the system comprising:

at least one processor operatively connected to a memory, the at least one processor when executing configured to:

receive active trip requests;

generate a shareability network graph based data structure from the active trip requests, wherein generation of the shareability network graph based data structure includes operations to:

create a data node in the graph based data structure for a plurality of respective active trip requests, evaluate shareability of the active trip requests based on a plurality of shareable conditions, define a plurality of connections between the plurality of respective data nodes responsive to a determination that respective requests are capable of sharing a vehicle for at least two active trip requests, wherein the determination is based on determining at least one of the plurality of sharing conditions is satisfied, wherein the data nodes and any connections establish the graph based data structure configured to process the plurality of trip requests in real time, and query the graph based data structure to determine a solution for a maximal number of shared trips, wherein determination of the maximal number of shared trips is based, at least in part, on the connections established within the data structure and a delay parameter, wherein querying the data structure induces a partition on the data structure between sharable trip requests and non-shareable trip requests; and trigger execution of the shareable trip requests, including at least a trip route including at least a first patron, a first pick up location and at least a second patron and a second pickup location with respective drop-off locations based on the determination of the solution for the maximal number of shared trips, and trigger execution of the non-sharable trip requests.

2. The system of claim 1, wherein the at least one processor is configured to store information as part of the data structure identifying which of the plurality of shareable conditions has been satisfied for an evaluated trip determined to be shareable.

3. The system of claim 1, wherein the at least one processor is configured to delete a node from the graph based data structure responsive to triggering execution of the associated trip request.

4. The system of claim 1, wherein the at least one processor is configured to match more than two shared trips in a given route.

5. The system of claim 1, wherein the at least one processor is configured to execute a maximum weighted matching algorithm to find a collection of shared trips that improves system efficiency.

6. The system of claim 1, wherein the at least one processor is configured to execute a maximum weighted matching algorithm to find a collection of shared trips that minimizes unoccupied vehicle time.

7. The system of claim 6, wherein at least one processor is configured to minimize unoccupied vehicle time according to a route specified by the maximum weighted matching algorithm.

8. The system of claim 7, wherein the system is configured to trigger execution of a second trip route including at least a third patron, a third pick up location and at least a fourth patron and a fourth pick up location, each with respective drop-off locations.

9. The system of claim 1, wherein at least one processor is configured to determine an additional time imposed by sharing a trip is less than a delay parameter specified as a user entered sharing condition.

10. The system of claim 1, wherein at least one processor is configured to determine a seating capacity threshold is valid based on a candidate sharing opportunity.

11. The system of claim 1, wherein at least one processor is configured to compute at least one or more condition from the following conditions to determine trip requests are shareable: A. (pickup time for first patron+travel time from first patron pick up to second patron pick up is less than or equal to unshared travel time+a delay parameter) and (pickup time for first patron+travel time from first patron pick up to second patron pick up+travel time from second patron pick up to second patron drop-off+travel time second patron drop-off to first patron drop-off is less than pickup time for first patron+travel time first patron pick up to first patron drop off+delay parameter) and (number of riders for first trip request+number of riders in subsequent request is less than or equal to passenger seating capacity); B. (pickup time for first patron+travel time from first patron pick up to second patron pick up+travel time from second patron pick up to first patron destination is less than or equal to pick up time for first patron+travel time first patron pick up to first patron drop off+delay parameter) and (pickup time for first patron+travel time from first patron pick up to second patron pick up+travel time from second patron pick up to first patron drop $off_e$+travel time from first patron drop off to second patron drop off is less than or equal to pick up time of subsequent patron+travel time from second patron pickup to second patron destination+delay parameter) and (number of riders for first trip request+number of riders in subsequent request is less than or equal to passenger seating capacity); C. (pickup time of subsequent patron+travel time from second patron pick up to first patron pick up<pickup time for first patron+delay parameter) and (pickup time of subsequent patron+travel time from second patron pick up to first patron pick up+travel time first patron pick up to first patron drop off+travel time from first patron drop-off to second patron drop-off is less than or equal to pickup time of subsequent patron+travel time from second patron pickup to second patron destination+delay parameter) and (number of riders for first trip request+number of riders in subsequent request is less than or equal to passenger seating capacity); or D. (pickup time of subsequent patron+travel time from second patron pick up to first patron pick up+Travel time from first patron pick up to second patron drop-off is less than or equal to pickup time of subsequent patron+travel time from second patron pickup to second patron destination+delay parameter) and (pickup time of subsequent patron+travel time from second patron pick up to first patron pick up+Travel time from first patron pick up to second patron drop-off+travel time second patron drop-off to first patron drop-off is less than or equal to pickup time for first patron+travel time first patron pick up to first patron drop off+delay parameter) and (number of riders for first trip request+number of riders in subsequent request is less than or equal to passenger seating capacity).

12. The system of claim 11, wherein the at least one processor is configured to assign a status for trip requests $R_A$ and R; within a shareability network data structure indicating that evaluated trips are sharable responsive to determining any one or more of the conditions A, B, C or D is satisfied.

13. The system of claim 12, wherein the at least one processor is configured to associate information for respective ones of the conditions that are met with the evaluated trips for respective data nodes in the data structure.

14. The system of claim 13, wherein the at least one processor is further configured to execute an evaluation of conditions A-D to build connections within the shareability network of requested trips.

15. The system of claim 1, wherein the data structure defines a set R of active trip requests for which trip sharing has not been defined.

16. The system of claim 15, wherein the system is configured to store as a data element ni associated with a trip request Ri, wherein ni is equal to a number of passengers associated with a respective trip request.

17. The system of claim 1, wherein the at least one processor is configured to compute in real time an output from the shareability network which includes on an order of ten thousand trips, wherein real time is less than 0.01 seconds.

18. A computer implemented method of matching ride sharing requests and dispatching of vehicles from a fleet of vehicles to meet the requests, the method comprising:

receiving, by at least one processor, active trip requests;

generating, by the at least one processor, a shareability graph based network data structure from the active trip requests, wherein generating of the shareability graph based network data structure includes:

creating a data node in the data structure for a plurality of respective active trip requests, evaluating shareability of the active trip requests based on a plurality of shareable conditions, and defining a plurality of connections between the plurality of respective data nodes within the data structure responsive to a determination that respective requests are capable of sharing a vehicle for at least two active trip requests, wherein the determination is based on determining at least one of the plurality of sharing conditions is satisfied, wherein the data nodes and any connections establish the graph based data structure configured to process the plurality of trip requests in real time;

querying the graph based data structure to determine a solution for a maximal number of shared trips, wherein determination of the maximal number of shared trips is based, at least in part, on the connections established within the data structure and a delay parameter, wherein querying the data structure induces a partition on the data structure between sharable trip requests and non-shareable trip requests; and triggering, by the at least one processor, execution of the shareable trip requests, including at least a trip route including at least a first patron, a first pick up location and at least a second patron and a second pickup location with respective drop-off locations based on the determination of the solution for the maximal number of shared trips, and triggering execution of the non-sharable trip requests.

19. The method of claim 18, wherein the method further comprises determining an additional time imposed by sharing a trip is less than a delay parameter specified as a user entered sharing condition.

20. A non-transitory computer readable medium comprising instruction that cause at least one process to perform a method for matching ride sharing requests and dispatching of vehicles from a fleet of vehicles to meet the requests, the method comprising:

receiving active trip requests;

generating a shareability graph based network data structure from the active trip requests, wherein generating of the shareability graph based network data structure includes:

creating a data node in the data structure for a plurality of respective active trip requests, evaluating shareability of the active trip requests based on a plurality of shareable conditions, and defining a plurality of connections between the plurality of respective data nodes within the data structure responsive to a determination that respective requests are capable of sharing a vehicle for at least two active trip requests, wherein the determination is based on determining at least one of the plurality of sharing conditions is satisfied, wherein the data nodes and any connections establish the graph based data structure configured to process the plurality of trip requests in real time;

querying the graph based data structure to determine a solution for a maximal number of shared trips, wherein determination of the maximal number of shared trips is based, at least in part, on the connections established within the data structure and a delay parameter, wherein querying the data structure induces a partition on the data structure between sharable trip requests and non-shareable trip requests; and triggering execution of the shareable trip requests, including at least a trip route including at least a first patron, a first pick up location and at least a second patron and a second pickup location with respective drop-off locations based on the determination of the solution for the maximal number of shared trips from the data structure, and triggering execution of the non-sharable trip requests.

* * * * *

UNITED STATES PATENT AND TRADEMARK OFFICE

CERTIFICATE OF CORRECTION

PATENT NO. : 11,288,603 B2
APPLICATION NO. : 16/553770
DATED : March 29, 2022
INVENTOR(S) : Carlo Filippo Ratti et al.

It is certified that error appears in the above-identified patent and that said Letters Patent is hereby corrected as shown below:

In the Claims

At Column 7, Line 44, "R" should read --$R_i$--

Signed and Sealed this
Twelfth Day of July, 2022

Katherine Kelly Vidal
*Director of the United States Patent and Trademark Office*